(12) United States Patent
Takenaka et al.

(10) Patent No.: US 8,414,404 B2
(45) Date of Patent: Apr. 9, 2013

(54) DAMPER MECHANISM

(75) Inventors: Tatsushi Takenaka, Toyota (JP); Yuichi Miwa, Toyota (JP); Taku Harada, Toyota (JP); Yoshimitsu Yokouchi, Okazaki (JP); Takeshi Miyagawa, Toyokawa (JP); Koji Hayashi, Aichi-gun (JP)

(73) Assignee: Toyota Jidosha Kabushiki Kaisha, Toyota (JP)

( * ) Notice: Subject to any disclaimer, the term of this patent is extended or adjusted under 35 U.S.C. 154(b) by 0 days.

(21) Appl. No.: 13/147,262

(22) PCT Filed: Nov. 6, 2009

(86) PCT No.: PCT/JP2009/068953
§ 371 (c)(1),
(2), (4) Date: Aug. 1, 2011

(87) PCT Pub. No.: WO2011/055442
PCT Pub. Date: May 12, 2011

(65) Prior Publication Data
US 2012/0115619 A1 May 10, 2012

(51) Int. Cl.
*F16F 15/129* (2006.01)
(52) U.S. Cl. ............... 464/68.4; 192/214; 192/214.1; 188/218 XL; 188/251 M
(58) Field of Classification Search ............ 464/68.2, 464/68.4, 68.41; 192/213.11, 213.12, 213.21, 192/213.22, 213.3, 213.31, 214, 214.1; 188/218 XL, 188/250 G, 251 M
See application file for complete search history.

(56) References Cited

U.S. PATENT DOCUMENTS

| | | | | | |
|---|---|---|---|---|---|
| 4,640,402 | A | * | 2/1987 | Hartig et al. | 192/214.1 X |
| 4,655,336 | A | * | 4/1987 | Caspar et al. | 192/214.1 X |
| 4,926,978 | A | * | 5/1990 | Shibata et al. | 188/251 M X |
| 5,715,922 | A | * | 2/1998 | Imanaka | 192/213.22 |
| 5,771,999 | A | * | 6/1998 | Kleifges et al. | 192/213.12 |

FOREIGN PATENT DOCUMENTS

| | | |
|---|---|---|
| JP | 52-056141 U | 4/1977 |
| JP | 61-282626 A | 12/1986 |
| JP | 2-30534 U | 2/1990 |
| JP | 2-54447 B | 11/1990 |
| JP | 4-266651 A | 9/1992 |
| JP | 7-32247 U | 6/1995 |
| JP | 11-230270 A | 8/1999 |

OTHER PUBLICATIONS

International Search Report mailed Dec. 8, 2009 in PCT/JP2009/068953, with English-language translation.

* cited by examiner

*Primary Examiner* — Gregory Binda
*Assistant Examiner* — Matthieu Setliff
(74) *Attorney, Agent, or Firm* — Oliff & Berridge, PLC

(57) ABSTRACT

In this damper mechanism, when small fluctuations in torque input to the damper mechanism occur, small hysteresis torque is produced as a result of pressure contact between a radial plate and a first friction section. Consequently, the small torque fluctuations can be damped between the radial plate and the first friction region of the damper mechanism and can be output to an input shaft. In addition, along the direction of relative rotation of an annular plate and the radial plate, the friction coefficients of the annular plate and the radial plate become larger as the torsion angles of both plates become larger. Therefore, even when torque fluctuations become large, the hysteresis torque can be produced in accordance with the magnitude of the torque fluctuations.

7 Claims, 13 Drawing Sheets

DAMPER MECHANISM

TECHNICAL FIELD

The present invention relates to a damper mechanism.

BACKGROUND ART

Various types of damper mechanisms provided between an output shaft of an engine and an input shaft of a transmission and the like, or in a hybrid vehicle, various types of damper mechanisms provided between an output shaft of an engine and a rotation shaft of a rotating electric machine (motor/generator) have been proposed in order to absorb transmitted torque fluctuations.

FIG. 18 shows one example of a mechanism for producing hysteresis torque, which is used in damper mechanisms disclosed in the following Patent Documents 1 and 2. This mechanism has a spline hub 320, and a spline internal tooth 320a of this spline hub 320 is spline fit to an input shaft (not shown) of a transmission. On both sides of a flange portion 320b of spline hub 320, an annular clutch plate 322 and an annular retaining plate 324 are provided with a spacing therebetween.

At an outer circumferential portion, clutch plate 322 and retaining plate 324 are fixed to flange portion 320b by a torsion spring (not shown) to be slidable within a predetermined torsion angle range. Clutch plate 322 and retaining plate 324 are coupled to each other by a stop pin 325a at the outer circumferential portion.

An annular second friction washer 326 for producing small hysteresis torque is disposed on each side of flange portion 320b to come into pressure contact with a side surface of flange portion 320b. Second friction washer 326 has a relatively small friction coefficient and absorbs torsion torque in a small torsion angle range.

An inner subplate 328 is in pressure contact with an outer end surface of each second friction washer 326. A first friction washer 330 for producing large hysteresis torque is sandwiched between inner subplate 328 and, clutch plate 322. First friction washer 330 for producing large hysteresis torque is also sandwiched between inner subplate 328 and retaining plate 324. First friction washer 330 is made of a material having a relatively large friction coefficient and absorbs torsion torque in a large torsion angle range.

An outer circumferential surface of clutch plate 322 is provided with an outer circumferential subplate 329 with first friction washer 330 interposed therebetween, and similarly, an outer circumferential surface of retaining plate 324 is provided with outer circumferential subplate 329 with first friction washer 330 interposed therebetween.

Inner subplate 328 and outer circumferential subplate 329 are coupled to each other by a subpin 332 at the outer circumferential portion in the radial direction. Subpin 332 passes through a long hole 334 (see FIG. 19) provided in flange portion 320b that will be described later.

Subpin 332 has a large diameter portion 333a at a central portion passing through long hole 334, and a small diameter portions 333b at opposing ends continuing from large diameter portion 333a. Small diameter portion 333b passes through an arc-shaped hole 323a of each of clutch plate 322 and retaining plate 324. Arc-shaped hole 323a is formed over a wide angle range to include the operating range of first friction washer 330. Arc-shaped hole 323a is formed over an angle range wider than that of long hole 334.

Inner subplate 328 and outer circumferential subplate 329 are fixed to small diameter portion 333b by a collar 333c. The length of small diameter portion 333b and collar 333c is set to be sandwiched between inner subplate 328 and outer circumferential subplate 329 and to bring first friction washer 330 into pressure contact with flange portion 320b.

Referring to FIG. 19, long hole 334 is formed to have a gap of θ/2 on each side of large diameter portion 333a. Inner subplate 328 and outer circumferential subplate 329 as well as flange portion 320b are slidable within a range of a sliding permissible angle θ obtained by taking the gap into consideration.

When torsion at a small torsion angle not larger than sliding permissible angle θ occurs due to engine torque fluctuations in the hysteresis torque producing mechanism having the above configuration, clutch plate 322, retaining plate 324, inner subplate 328, outer circumferential subplate 329, and first friction washer 330 pivot integrally because subpin 332 coupling inner subplate 328 and outer circumferential subplate 329 is slidable in long hole 334. Therefore, second friction washer 326 that is in pressure contact with inner subplate 328 and flange portion 320b produces small hysteresis torque for absorbing the torque fluctuations.

When torsion at a large torsion angle not smaller than sliding permissible angle θ occurs due to engine torque fluctuations, large diameter portion 333a abuts a side surface of long hole 334. Therefore, large hysteresis torque for absorbing the torque fluctuations is produced on two friction surfaces between first friction washer 330 and clutch plate 322 as well as two friction surfaces between first friction washer 330 and retaining plate 324.

Here, it can be considered that the hysteresis torque producing mechanism in the above mechanism has problems that will be described below. Schematic diagrams shown in FIGS. 20 to 22 are used to explain these problems. First, referring to FIG. 20, a member B1 is placed on a member A1. An upright pin P1 is formed on an upper surface of member B1. The load of member B1 is m2. The friction coefficient between member A1 and member B1 is $\mu 2$.

A member C1 is placed on an upper surface of member B1. A long hole H1 is formed in member C1 and pin P1 is inserted into this long hole H1. Long hole H1 is formed to have a gap of θ/2 on each side of pin P1. Member C1 can slide on the upper surface of member B1 within the range of sliding permissible angle θ obtained by taking the gap into consideration. The load of member C1 is m1. The friction coefficient between member B1 and member C1 is $\mu 1$. Friction coefficient $\mu 2$ is set to be larger than friction coefficient $\mu 1$.

When torsion at a small torsion angle not larger than sliding permissible angle occurs due to small torque fluctuations (F1), small hysteresis torque ($\mu 1 \times m1$) for absorbing the torque fluctuations is produced between member B1 and member C1. This corresponds to the small hysteresis torque for absorbing the torque fluctuations produced by second friction washer 326 that is in pressure contact with inner subplate 328 and flange portion 320b in FIG. 18.

Next, as shown in FIG. 21, when torsion at a large torsion angle not smaller than sliding permissible angle θ occurs due to large torque fluctuations (F3), pin P1 abuts a side surface of long hole H1. Therefore, member B1 and member C1 moves integrally and large hysteresis torque ($\mu 2 \times (m1+m2)$) for absorbing the torque fluctuations is produced between member A1 and member B1. This corresponds to the large hysteresis torque for absorbing the torque fluctuations produced on the two friction surfaces between first friction washer 330 and clutch plate 322 as well as the two friction surfaces between first friction washer 330 and retaining plate 324.

However, even when the torsion at a torsion angle not smaller than sliding permissible angle θ occurs due to torque fluctuations, a phenomenon in which integral member B1 and member C1 cannot slide on member A1 and the torque fluctuations cannot be damped occurs as shown in FIG. 22, if large torque fluctuations (F2) that cannot be absorbed occur between member A1 and member B1. In other words, the damper mechanism is locked.

When the damper mechanism is locked, a phenomenon occurs in which torque fluctuations input to the damper mechanism are output to the input shaft as they are. Particularly in a hybrid vehicle, this phenomenon occurs easily at the time of initial explosion during engine startup and at the time of medium-sized torque fluctuations such as during gradual acceleration. Due to this phenomenon, a collision sound (commonly called rattle or muffled sound) and the like caused by collision between gear wheels are transmitted to the vehicle interior and the vehicle interior environment may be deteriorated. In addition, a sound absorbing material for absorbing noise must be added to solve deterioration of the vehicle interior environment, which results in an increase in cost. In addition, if the engine operating point is changed in order to reduce the noise, the fuel efficiency becomes poor.

Here, in the damper mechanism, smaller hysteresis torque, which is friction resistance of the damper mechanism, is advantageous for small torque fluctuations such as vibration produced at the time of vehicle traveling such as during gradual acceleration, because the damper mechanism undergoes proper torsion. On the other hand, larger hysteresis torque, which is friction resistance of the damper mechanism, is advantageous for large torque fluctuations such as shock at the time of engine startup, because vibration must be sufficiently damped.

However, when a variable hysteresis damper mechanism as shown in FIGS. 18 and 19 is mounted in an engine having a smaller number of cylinders than a serial four-cylinder engine whose engine torque fluctuations are large, locking of the damper mechanism as described above may occur although two-step hysteresis torque can be produced in the entire engine input torque range.

As described above, conflicting hysteresis torque is requested in the damper mechanism and importance has been placed recently on the quietness performance and the like of the vehicle interior. Therefore, a damper mechanism that can effectively damp torque fluctuations has been strongly desired.

PRIOR ART DOCUMENTS

Patent Documents

Patent Document 1: Japanese Utility Model Laying-Open No. 52-56141
Patent Document 2: Japanese Patent Laying-Open No. 61-282626

SUMMARY OF THE INVENTION

Problems to be Solved by the Invention

The problems to be solved by the present invention are that when torque fluctuations in a range where the torque fluctuations cannot be damped are input at the time of input of an engine output to a damper mechanism, the torque fluctuations that cannot be damped sufficiently by the damper mechanism are transmitted to a transmission and the like, which may result in deterioration of the vehicle interior environment such as transmission of a collision sound and the like caused by collision between gear wheels into the vehicle.

The present invention has been made to solve the above problems and an object thereof is to provide a damper mechanism including a mechanism that can effectively damp torque fluctuations.

Means for Solving the Problems

A damper mechanism based on the present invention includes: a first rotating member; and a second rotating member arranged to face the first rotating member, having a rotation center axis identical to a rotation center axis of the first rotating member, and being capable of relative displacement at a predetermined angle in a circumferential direction of the rotation center axis. The first rotating member includes a first pressure contact region arranged annularly around the rotation center axis and coming into pressure contact with the second rotating member. The second rotating member includes a second pressure contact region arranged with a predetermined spacing around the rotation center axis and coming into pressure contact with the first pressure contact portion. The first pressure contact region has a first friction region and a second friction region larger in friction coefficient than the first friction region, the first friction region and the second friction region being alternately arranged along the circumferential direction. The second pressure contact region is located at a central position of the first friction region in the circumferential direction when there is no input of torque to the damper mechanism from outside.

In another form of the above damper mechanism, the first pressure contact region has an annular plate disposed at a position of the first rotating member facing the second rotating member. A surface facing the second rotating member has a first friction section serving as the first friction region and a second friction section serving as the second friction region, the first friction section and the second friction section being alternately provided along the circumferential direction of the annular plate. The second pressure contact region is a radial plate extending radially from the rotation center axis, a plurality of radial plates being arranged along the circumferential direction.

In another form of the above damper mechanism, the first friction sections and the second friction sections are alternately arranged at four positions at a pitch of 90° along the circumferential direction, respectively. The radial plates are arranged at four positions at a pitch of 90° in the circumferential direction.

In another form of any one of the above damper mechanisms, a central portion of the second friction section in the circumferential direction is larger in friction coefficient than a region of the second friction section adjacent to the first friction section.

In another form of the above damper mechanism, the second friction section has a side portion friction section larger in friction coefficient than the first friction section and located at the region adjacent to the first friction section, and a central portion friction section larger in friction coefficient than the side portion friction section and located at the central portion of the second friction section.

In another form of the above damper mechanism, the friction coefficient of the second friction section gradually increases from the region adjacent to the first friction section toward the central portion of the second friction section in the circumferential direction.

In another form of the above damper mechanism, the first rotating member has a friction plate disposed at a position facing the second rotating member. The friction plate has an inner annular plate and an outer friction plate arranged on an outer circumferential side of the inner annular plate and arranged with a predetermined spacing in the circumferential direction. The inner annular plate in a region of the inner annular plate where the outer friction plate is not provided constitutes the first friction region. The inner annular plate and the outer friction plate in a region of the inner annular plate where the outer friction plate is provided constitute the second friction region. The second pressure contact region is a radial plate extending radially from the rotation center axis, a plurality of radial plates being arranged along the circumferential direction.

In another form of the above damper mechanism, the outer friction plates are arranged at four positions at a pitch of 90° along the circumferential direction. The radial plates are arranged at four positions at a pitch of 90° in the circumferential direction.

Effects of the Invention

According to the damper mechanism based on the present invention, there can be provided a damper mechanism including a mechanism that can effectively damp torque fluctuations.

MODES FOR CARRYING OUT THE INVENTION

Figure 1:
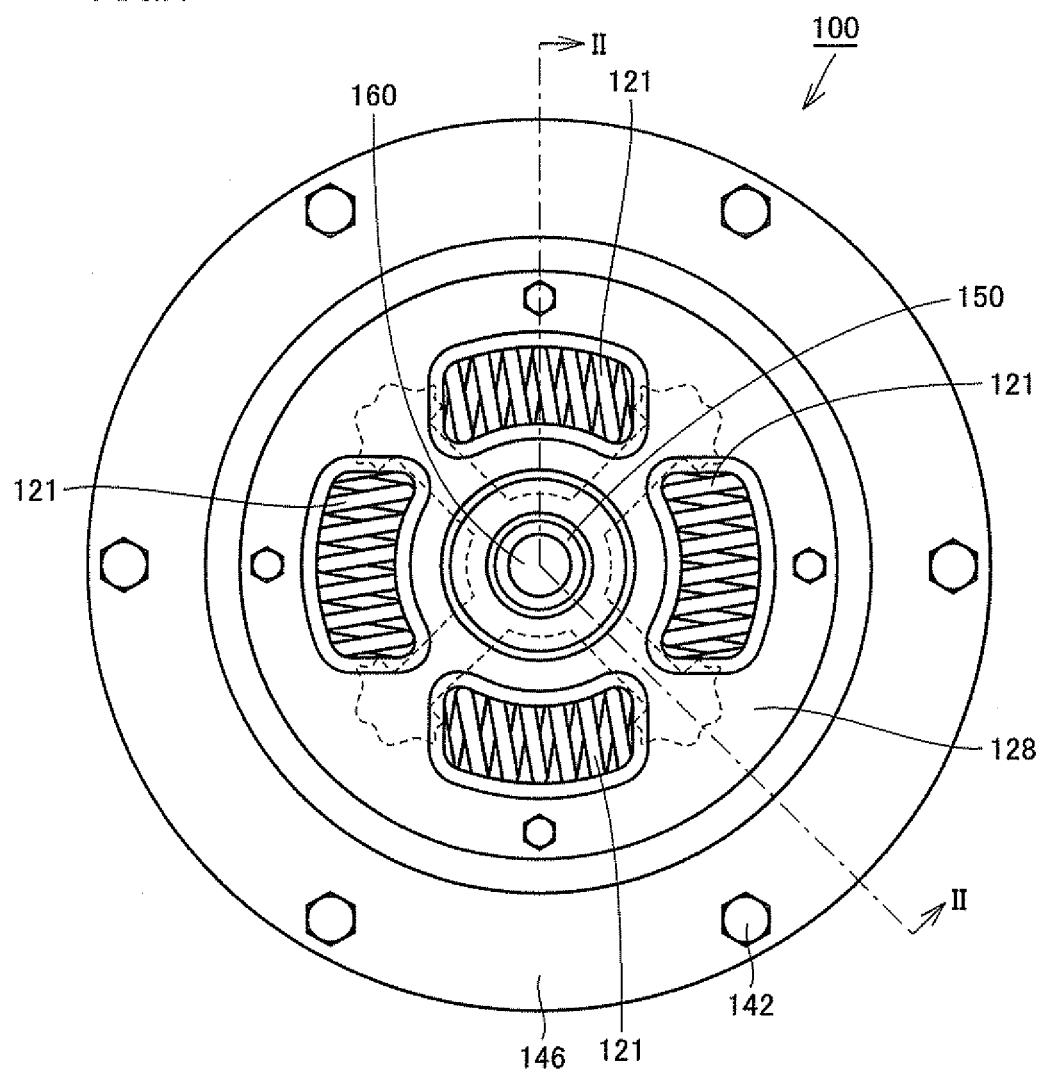
FIG. 1 is a plan view of a damper mechanism according to a first embodiment.

A damper mechanism according to each embodiment based on the present invention will be described hereinafter with reference to the drawings. In each embodiment described below, descriptions of numbers, amounts and the like are not intended to limit the scope of the invention unless otherwise specified. In addition, the same or corresponding components are denoted with the same reference numerals, and the same description may not be repeated. In addition, use in combination as appropriate of a configuration according to each embodiment described below is originally encompassed.

First Embodiment

Damper Mechanism 100

Figure 2:
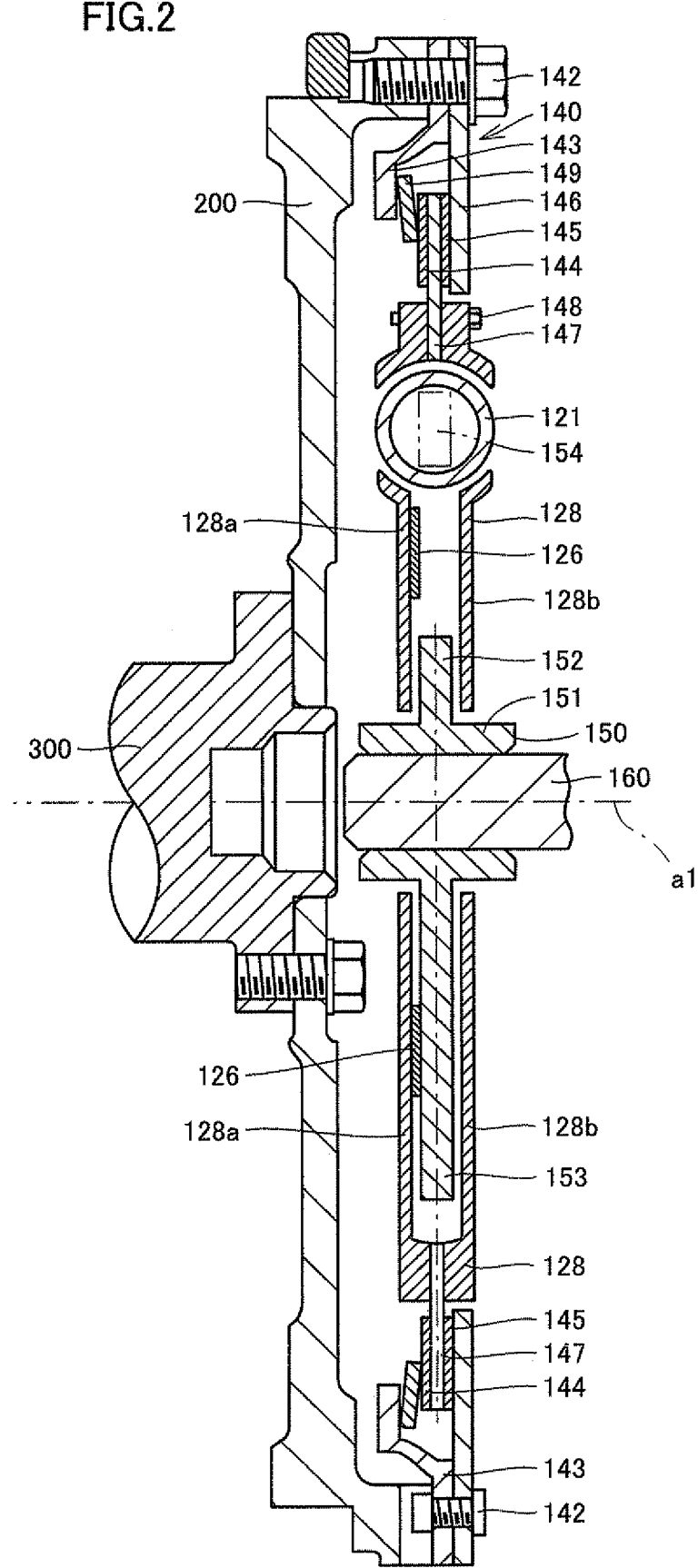
FIG. 2 is a cross-sectional view taken along line II-II in FIG. 1.

A damper mechanism 100 according to a first embodiment based on the present invention will be described with reference to FIGS. 1 and 2. Damper mechanism 100 is a damper mechanism provided between an output shaft of an engine and an input shaft of a transmission and the like, or a damper mechanism provided between an output shaft of an engine and a rotation shaft of a rotating electric machine (motor/generator) in a hybrid vehicle. Damper mechanism 100 can be used to absorb torque fluctuations in other power transmission.

Damper mechanism 100 includes a hub 150 having an input shaft 160 spline fit thereto and provided to be capable of rotating about a rotation center axis a1, a drive plate (first rotating member) 128 provided at this hub 150 to be capable of rotating relatively to the direction of rotation of hub 150, and a spring damper 121 engaging with drive plate 128 and hub 150. Spring dampers 121 are provided at four positions in the circumferential direction.

Damper mechanism 100 includes a flywheel 200 fixed to a crankshaft 300 provided to be capable of being rotationally driven by power from the engine coaxially with rotation center axis a1 of input shaft 160. An outer circumferential portion of flywheel 200 and an outer circumferential portion of drive plate 128 are coupled to each other by a torque limiter 140. Torque limiter 140 can control torque applied from flywheel 200 to drive plate 128.

(Hub 150)

Figure 3:
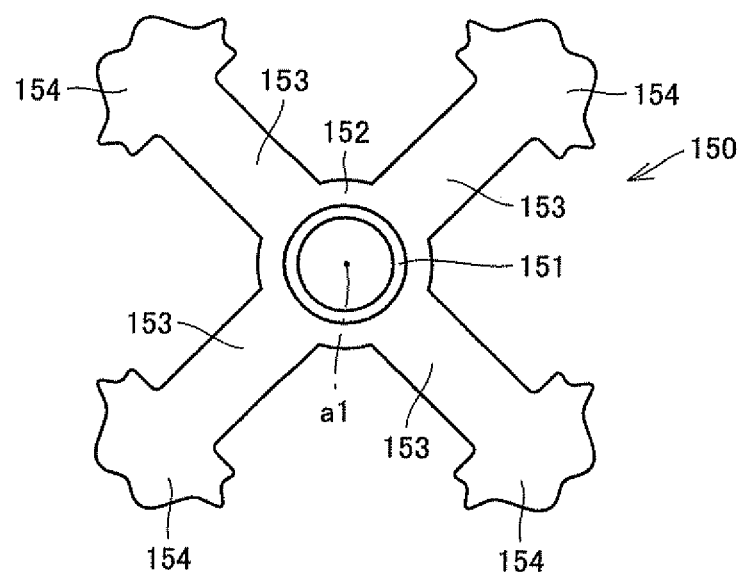
FIG. 3 is a plan view of a radial plate used in the damper mechanism according to the first embodiment.

As shown in FIG. 3, hub 150 (second rotating member) has a cylindrical portion 151 formed to be capable of receiving input shaft 160, a disc portion 152 provided to continue outwardly from an outer circumferential surface of cylindrical portion 151, and a radial plate 153 extending radially from disc portion 152. Radial plates 153 are arranged at four positions at a pitch of 90° in the circumferential direction. A tip of each radial plate 153 has an engaging portion 154 with spring damper 121.

(Drive Plate 128)

Drive plate 128 (first rotating member) includes an inner plate 128a arranged on a side facing flywheel 200, and an outer plate 128b located on the opposite side of inner plate 128a with respect to radial plate 153. Inner plate 128a and outer plate 128b are united by a rivet 148. An annular plate 126 that is in pressure contact with radial plate 153 is attached to a surface of inner plate 128a that faces radial plate 153. Annular plate 126 is pressed against radial plate 153 by inner plate 128a. Annular plate 126 will be described in detail later.

(Torque Limiter 140)

Torque limiter 140 includes a pressing plate 146 provided on the outer circumferential side of drive plate 128 and formed annularly, an annular brake plate 147 sandwiched between drive plates 128 and extending radially from an outer circumferential edge of drive plate 128, a coned disc spring 149, and a support plate 143.

Brake plate 147 is sandwiched between drive plates 128 using rivet 148. Lining portions 144 and 145 are attached to both surfaces of an outer circumferential edge of brake plate 147. Lining portion 144 is in contact with coned disc spring 149 and lining portion 145 is in contact with pressing plate 146.

Support plate 143 and pressing plate 146 are integrally coupled to flywheel 200 by a bolt 142. Coned disc spring 149 presses lining portion 144, and thus, lining portion 145 is pressed against pressing plate 146. As a result, the surface pressure between lining portion 145 and pressing plate 146 is ensured. In addition, support plate 143 and pressing plate 146 rotate along with flywheel 200.

When pressing plate 146 rotates, lining portions 144, 145 and brake plate 147 rotate along with pressing plate 146 due to the friction between lining portion 145 and pressing plate 146.

(Power Transmission Path)

When crankshaft 300 rotates by driving power from the engine, flywheel 200 rotates. The rotation of flywheel 200 causes rotation of brake plate 147 through torque limiter 140. The rotation of brake plate 147 causes rotation of drive plate 128. Furthermore, rotation of spring damper 121 along with drive plate 128 causes rotation of radial plate 153 engaging with spring damper 121. As a result, the driving power of crankshaft 300 is transmitted to input shaft 160 coupled to hub 150.

(Damping of Torque Fluctuations)

Damping of torque fluctuations by annular plate 126 serving as a first pressure contact region and four radial plates 153 serving as second pressure contact regions will now be described with reference to FIGS. 3 to 7. As shown in FIG. 3, radial plate 153 extends radially from disc portion 152 provided at cylindrical portion 151 of hub 150 serving as the second rotating member, and radial plates 153 are arranged at four positions at a pitch of 90° in the circumferential direction as described above.

Figure 4:
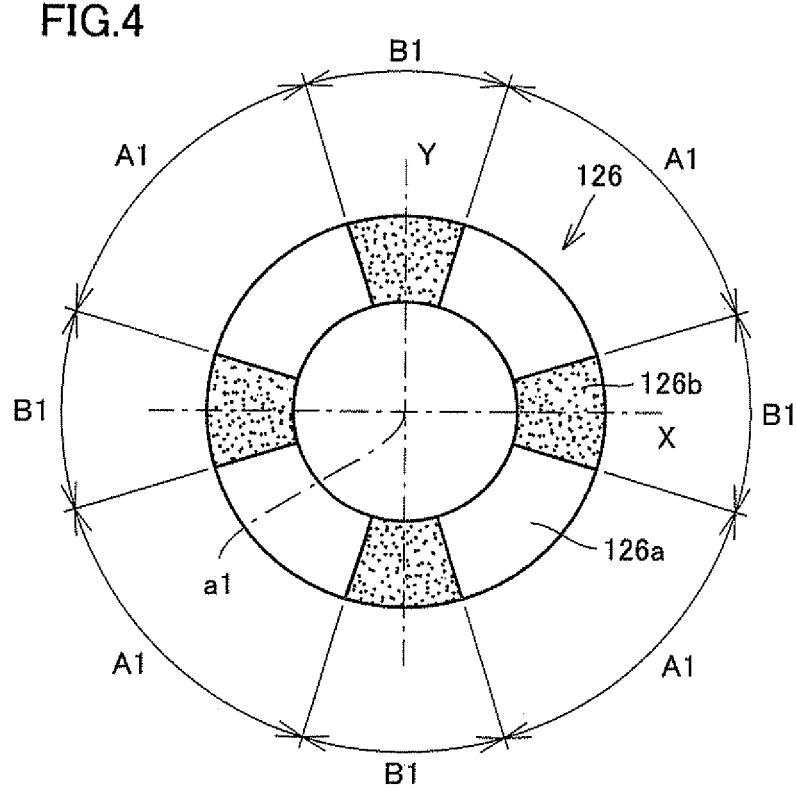
FIG. 4 is a plan view of an annular plate used in the damper mechanism according to the first embodiment.

As shown in FIG. 4, in annular plate 126, first friction sections 126a serving as first friction regions A1 and second friction sections 126b serving as second friction regions B1 are alternately arranged at four positions at a pitch of 90° in the circumferential direction, respectively. Second friction section 126b is a region that is larger in friction coefficient than first friction section 126a with annular plate 126 being in pressure contact with radial plate 153.

Figure 5:
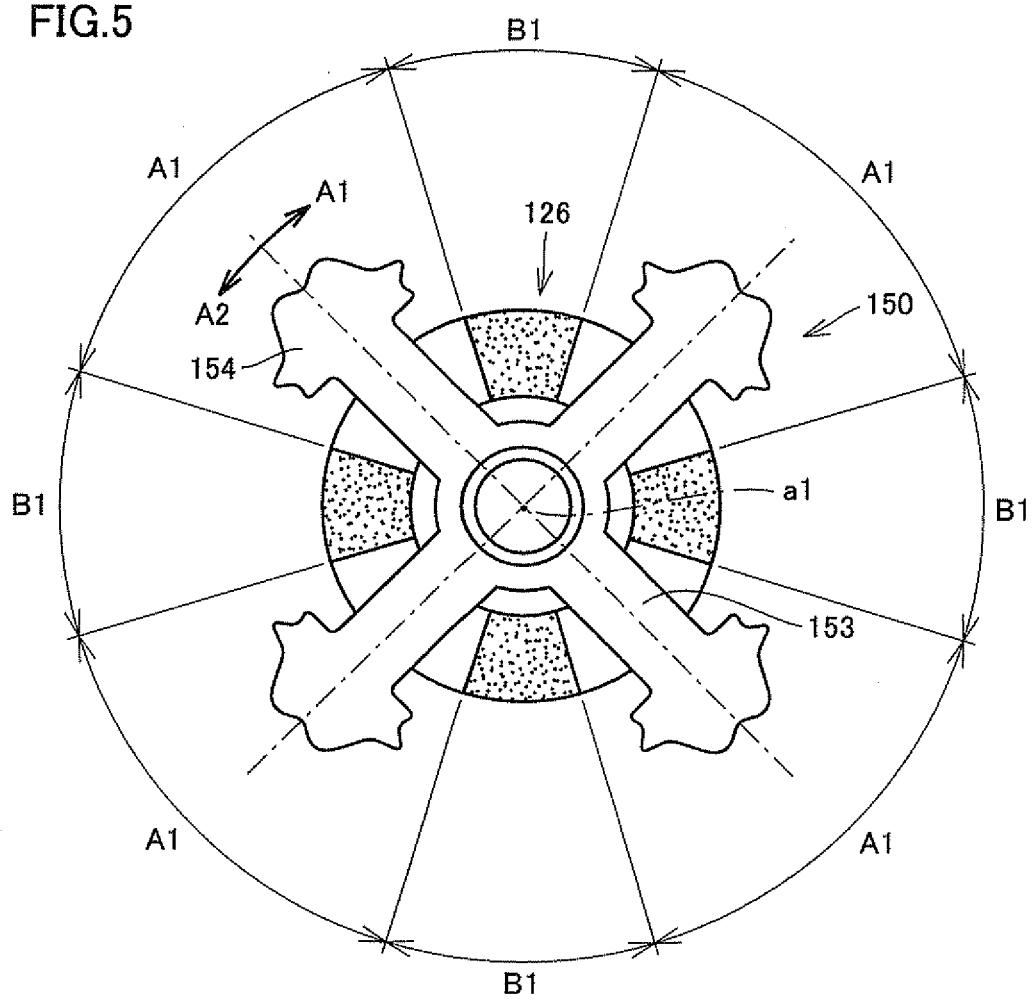
FIG. 5 is a first diagram showing an overlapping state of the annular plate and the radial plate in the first embodiment.

FIG. 5 is a diagram showing an overlapping state of annular plate 126 and four radial plates 153 in a pressure contact state. This is a state (nominal state) where there is no fluctuation in torque input to damper mechanism 100 from outside, and radial plate 153 is located at the central position of first friction section 126a in the circumferential direction. When fluctuations in torque input to this damper mechanism 100 occur, annular plate 126 and four radial plates 153 rotate relatively in a direction of an arrow A1 or A2 shown in the figure.

The fluctuations in input torque bring about the state where annular plate 126 and four radial plates 153 rotate relatively to each other. When the fluctuations in input torque are small, radial plate 153 produces small hysteresis torque within the range of first friction region A1. As a result, the small torque fluctuations are damped between radial plate 153 and first friction section 126a.

Figure 7:
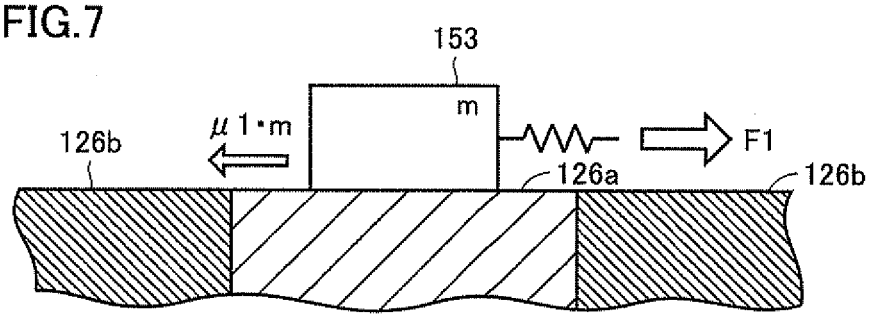
FIG. 7 is a first diagram schematically showing a principle of torque fluctuation damping in the first embodiment.

FIG. 7 schematically shows this damping state. When small torque fluctuations (F1) occur, small hysteresis torque ($\mu 1 \times m$) for absorbing the torque fluctuations is produced between radial plate 153 and first friction section 126a. $\mu 1$ indicates the friction coefficient between radial plate 153 and first friction section 126a, and m indicates the load applied to radial plate 153.

Figure 6:
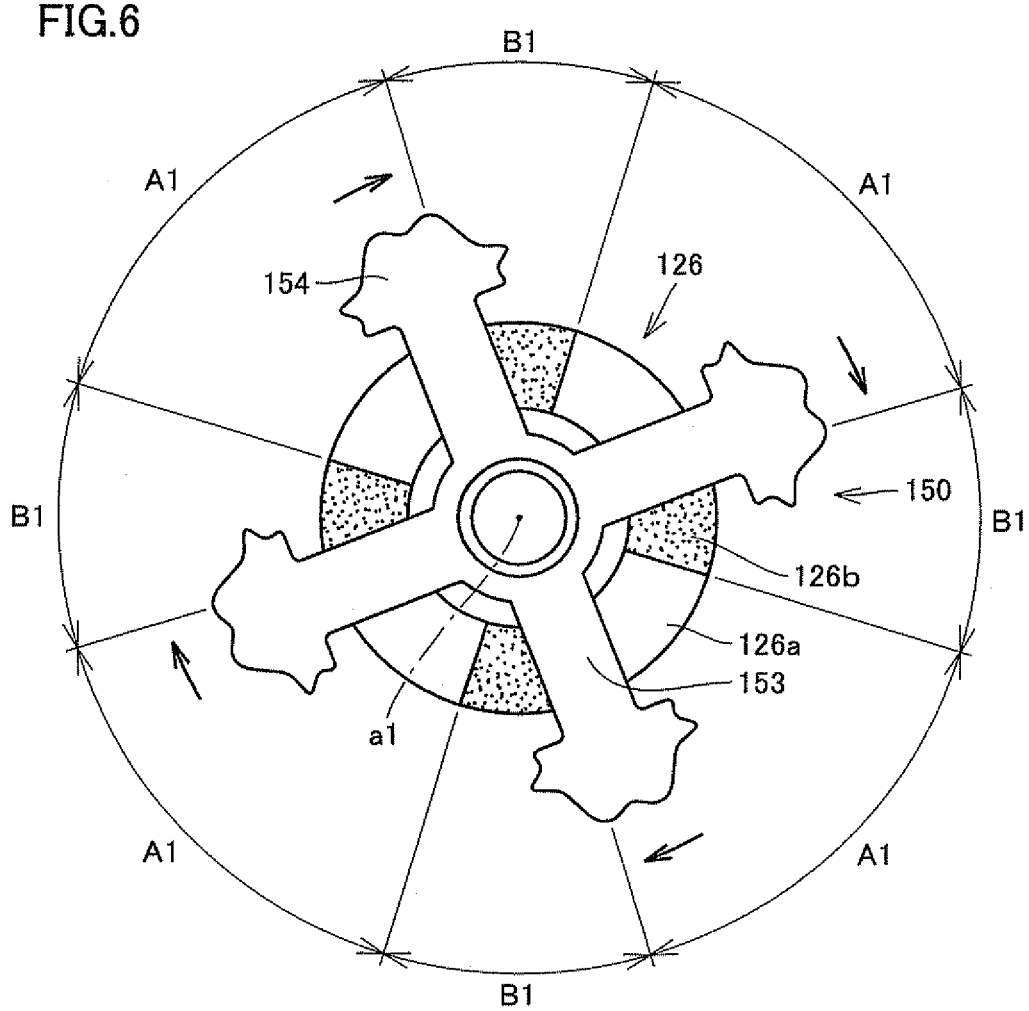
FIG. 6 is a second diagram showing an overlapping state of the annular plate and the radial plate in the first embodiment.

Next, as shown in FIG. 6, when the fluctuations in input torque become large, radial plate 153 relatively moves from first friction region A1 to reach second friction region B1, for example. At this time, radial plate 153 produces the hysteresis torque within the range of a total of the friction coefficients of first friction section 126a and second friction section 126b at a boundary between both sections because second friction section 126b is larger in friction coefficient than first friction section 126a. As a result, when the fluctuations in torque input to the damper mechanism become large, the torque fluctuations are damped between radial plate 153 and first and second friction sections 126a and 126b.

Figure 8:
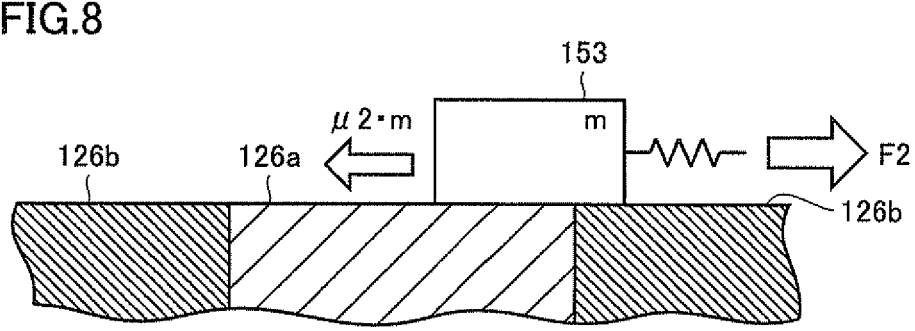
FIG. 8 is a second diagram schematically showing the principle of torque fluctuation damping in the first embodiment.

FIG. 8 schematically shows this damping state. When torque fluctuations larger than the above F1 (F2: F2>F1) occur, hysteresis torque ($\mu 2 \times m$) for absorbing the torque fluctuations is produced between radial plate 153 and first and second friction sections 126a and 126b. $\mu 2$ indicates the friction coefficient between radial plate 153 and a combination of both first friction section 126a and second friction section 126b ($\mu 2 > \mu 1$).

Next, when the fluctuations in input torque become larger, entire radial plate 153 relatively moves to reach second friction region B1 (second friction section 126b). Consequently, large hysteresis torque is produced because second friction section 126b is larger in friction coefficient than first friction section 126a. As a result, the larger torque fluctuations are damped between radial plate 153 and second friction section 126b.

Figure 9:
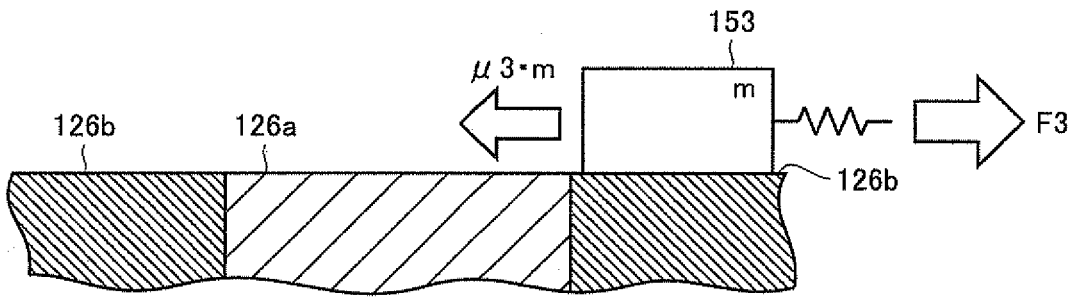
FIG. 9 is a third diagram schematically showing the principle of torque fluctuation damping in the first embodiment.

FIG. 9 schematically shows this damping state. When torque fluctuations larger than the above F2 (F3: F3>F2) occur, hysteresis torque ($\mu 3 \times m$) for absorbing the torque fluctuations is produced between radial plate 153 and second friction section 126b.

indicates the friction coefficient between radial plate 153 and second friction section 126b ($\mu 3 > \mu 2$).

(Functions and Effects)

Damper mechanism 100 according to the embodiment based on the present invention has the following features. The hysteresis torque damping mechanism in the above background art allows, over the entire torque range, production of small hysteresis torque when small torque fluctuations occur, and production of large hysteresis torque when large torque fluctuations occur.

Figure 10:
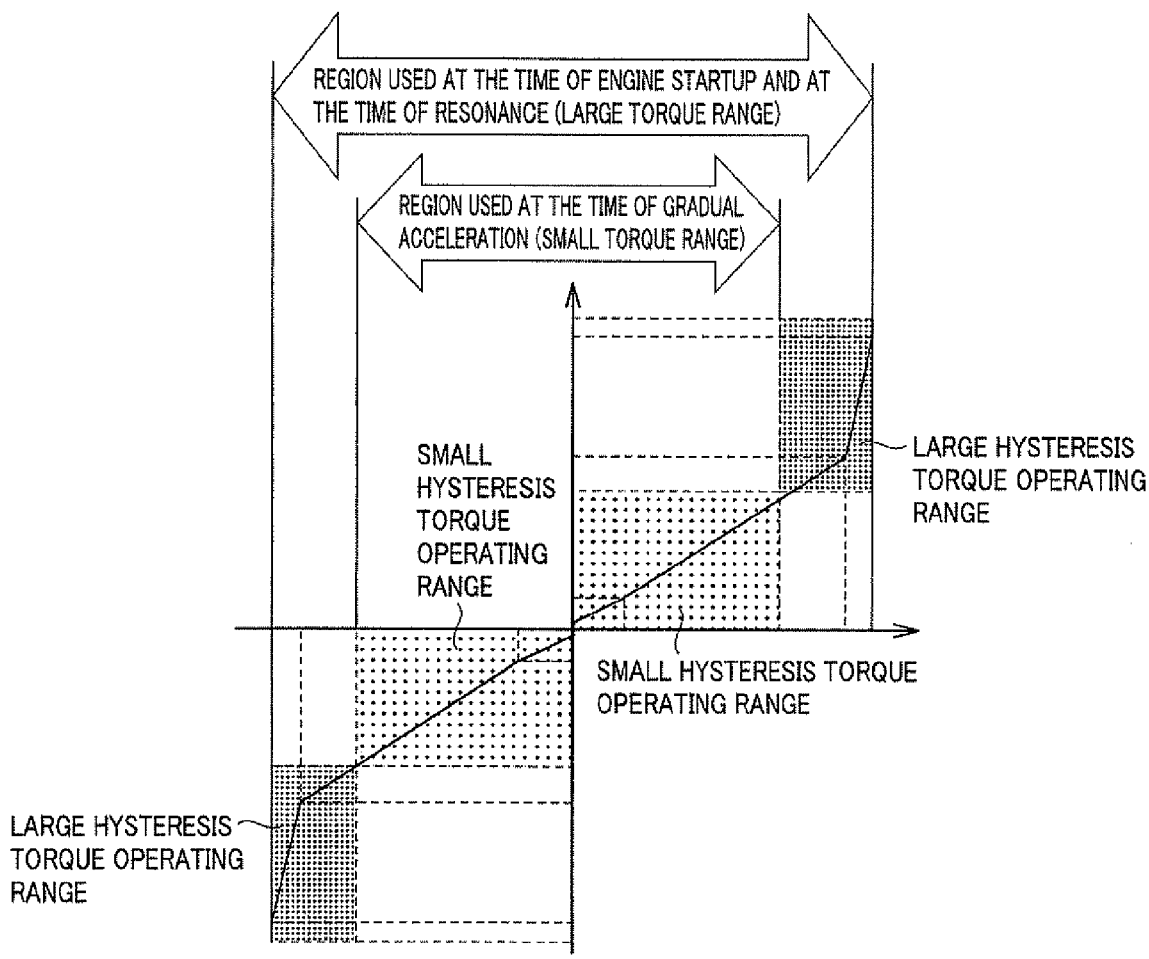
FIG. 10 is a schematic diagram showing a relationship between a small hysteresis operating range and a large hysteresis operating range in the first embodiment.

In actual torque fluctuations, however, a small torque range that is a region used at the time of gradual acceleration can be considered as the region where the small hysteresis torque should be produced, and a large torque range that is a region used at the time of engine startup, at the time of resonance and the like can be considered as the region where the large hysteresis torque should be produced, as shown in FIG. 10.

Thus, in the hysteresis torque damping mechanism according to the present embodiment, torque fluctuations that may be produced in an intended torque range can be effectively damped.

In other words, damper mechanism 100 according to the embodiment based on the present invention includes annular plate 126 serving as the first pressure contact region and arranged annularly around rotation center axis a1, and radial plate 153 serving as the second pressure contact region and arranged around rotation center axis a1 with a predetermined spacing. In annular plate 126, first friction region A1 (first friction section 126a) and second friction region B1 (second friction section 126b) larger in friction coefficient than this first friction region A1 (first friction section 126a) are alternately arranged in the circumferential direction.

As a result, when small fluctuations in torque input to damper mechanism 100 occur, the small hysteresis torque is produced as a result of relative small rotation movement caused by the pressure contact between radial plate 153 and first friction section 126a. Consequently, the small fluctuations in torque input to damper mechanism 100 can be damped between radial plate 153 and first friction section 126a.

In addition, along the direction of relative rotation of annular plate 126 and radial plate 153, the friction coefficients of annular plate 126 and radial plate 153 become larger as the torsion angles of both plates become larger. Therefore, even when fluctuations in torque input to damper mechanism 100 become large, the hysteresis torque can be produced in accordance with the magnitude of the torque fluctuations as a result of the large rotation movement of annular plate 126 and radial plate 153.

Consequently, the relative rotation of annular plate 126 and radial plate 153 is not fixed and fluctuations in torque input to damper mechanism 100 can be damped constantly. As a result, vibration at the time of engine startup as well as vibration that occurs at the time of torque fluctuations can be effectively damped. Consequently, production of the collision sound (commonly called rattle or muffled sound) caused by collision between gear wheels can be avoided and deterioration of the vehicle interior environment can be prevented.

Figure 11:
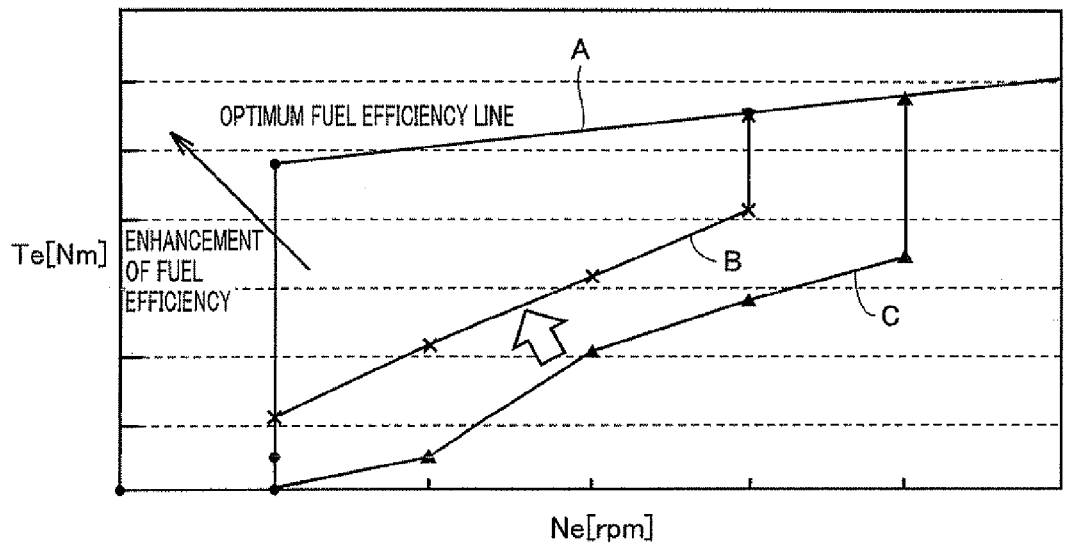
FIG. 11 is a schematic diagram showing an optimum fuel efficiency line.

In addition, FIG. 11 shows an optimum fuel efficiency line (line A) in a relationship between torque (Te) and the number of rotations (Ne). In the present embodiment, a fuel efficiency line (line B) can be brought closer to line A as compared with a conventional fuel efficiency line (line C), and the fuel efficiency can also be enhanced.

In the above embodiment, the case has been described where the friction coefficient does not vary within second friction section 126b shown in FIG. 4. However, by making larger the friction coefficient of a central portion of second friction section 126b in the circumferential direction than that of a region adjacent to first friction section 126a, inside second friction section 126b, the hysteresis torque can be produced more smoothly in accordance with the magnitude of torque fluctuations.

Figure 12:
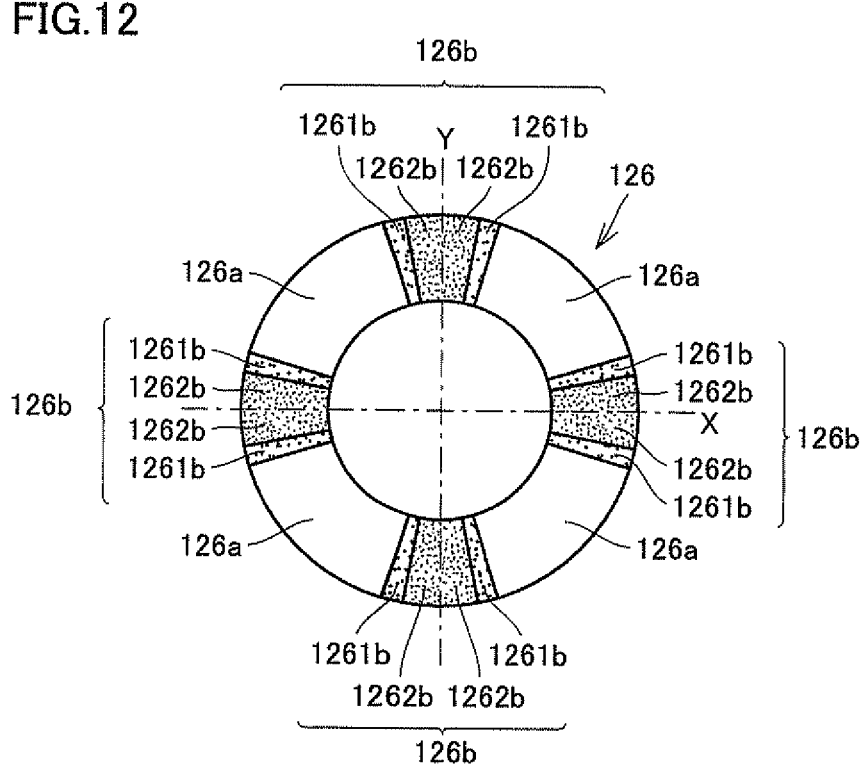
FIG. 12 is a plan view of another form of the annular plate used in the damper mechanism according to the first embodiment.

For example, as shown in FIG. 12, a side portion friction section 1261b having a larger friction coefficient than that of first friction section 126a can be provided at the region adjacent to first friction section 126a, and a central portion friction section 1262b having a larger friction coefficient than that of side portion friction section 1261b can be provided at the central portion (boundary lines indicated with X and Y in the figure) of second friction section 126b.

Figure 13:
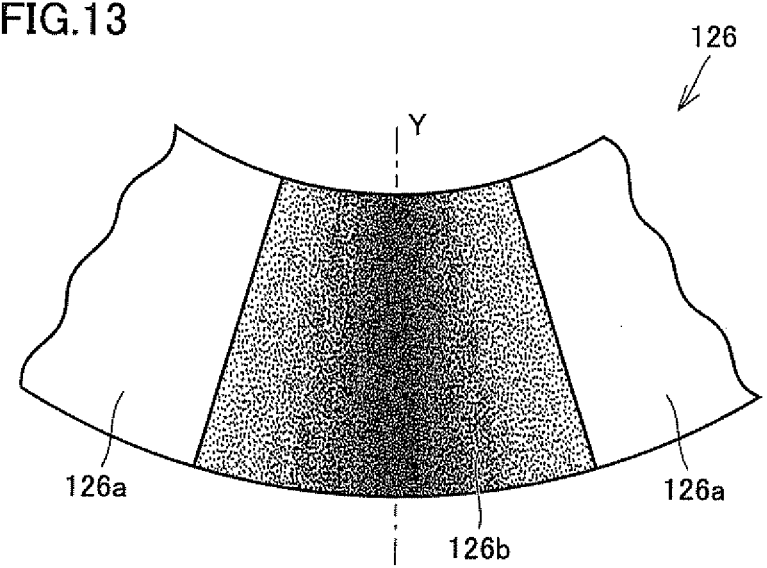
FIG. 13 is a plan view of still another form of the annular plate used in the damper mechanism according to the first embodiment.

In addition, as another form of second friction section 126b, a region can also be employed whose friction coefficient gradually increases from the region adjacent to first friction section 126a toward the central portion (boundary line indicated with Y in the figure) of second friction section 126b in the circumferential direction, as shown in FIG. 13.

Figure 14:
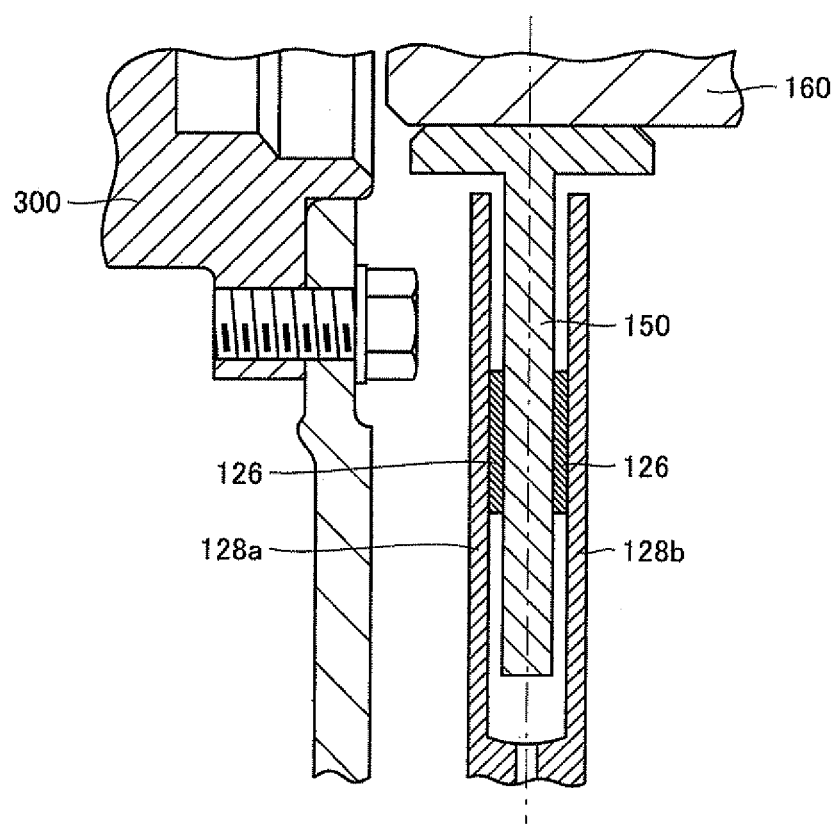
FIG. 14 is a partially enlarged cross-sectional view showing another mechanism of the damper mechanism according to the first embodiment.

In addition, in the above embodiment, the case has been described where annular plate 126 is provided on inner plate 128a of drive plate 128. As shown in FIG. 14, however, annular plates 126 can also be provided on both inner plate 128a and outer plate 128b of drive plate 128. Furthermore, annular plate 126 can also be provided only on outer plate 128b.

Second Embodiment

In the above first embodiment, the case has been described where annular plate 126 has alternately provided first friction section 126a and second friction section 126b and first friction section 126a serves as first friction region A1 and second friction section 126b serves as second friction region B1. In the present embodiment, however, a configuration shown in the following FIGS. 15 to 17 can also be employed.

Figure 15:
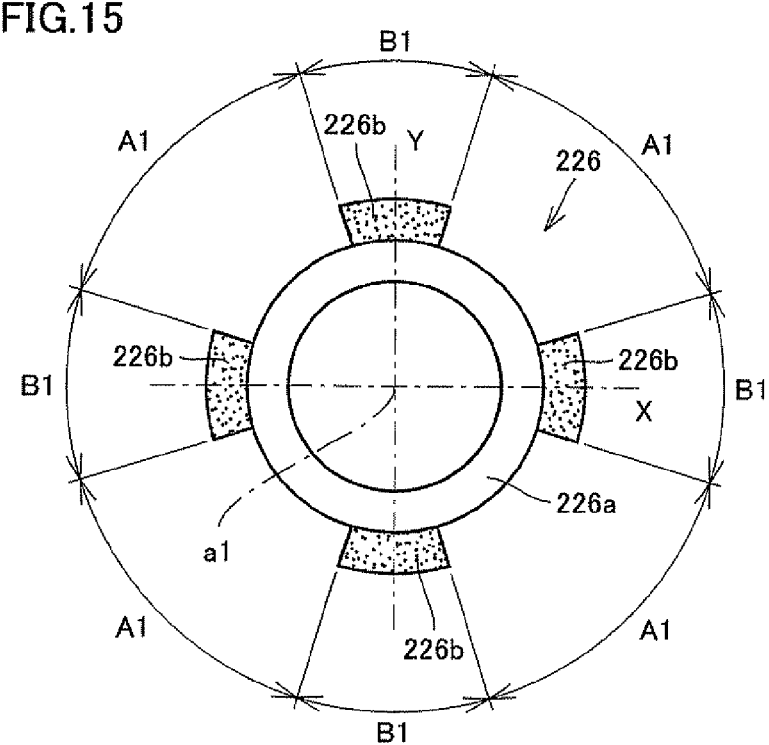
FIG. 15 is a plan view of an annular plate used in a damper mechanism according to a second embodiment.

Referring to FIG. 15, a friction plate 226 is disposed at a position of first rotating member 128 facing second rotating member 150. This friction plate 226 has an inner annular plate 226a and an outer friction plate 226b arranged on the outer circumferential side of this inner annular plate 226a and arranged with a predetermined spacing in the circumferential direction. In the present embodiment, outer friction plates 226b are arranged at four positions at a pitch of 90° along the circumferential direction. Outer friction plate 226b is provided to be larger in friction coefficient than inner annular plate 226a with friction plate 226 being in pressure contact with radial plate 153.

Inner annular plate 226a in a region of inner annular plate 226a where outer friction plate 226b is not provided constitutes first friction region A1, and inner annular plate 226a and outer friction plate 226b in a region of inner annular plate 226a where outer friction plate 226b is provided constitute second friction region B1. The form of second rotating member 150 is the same as the form shown in FIG. 3.

Figure 16:
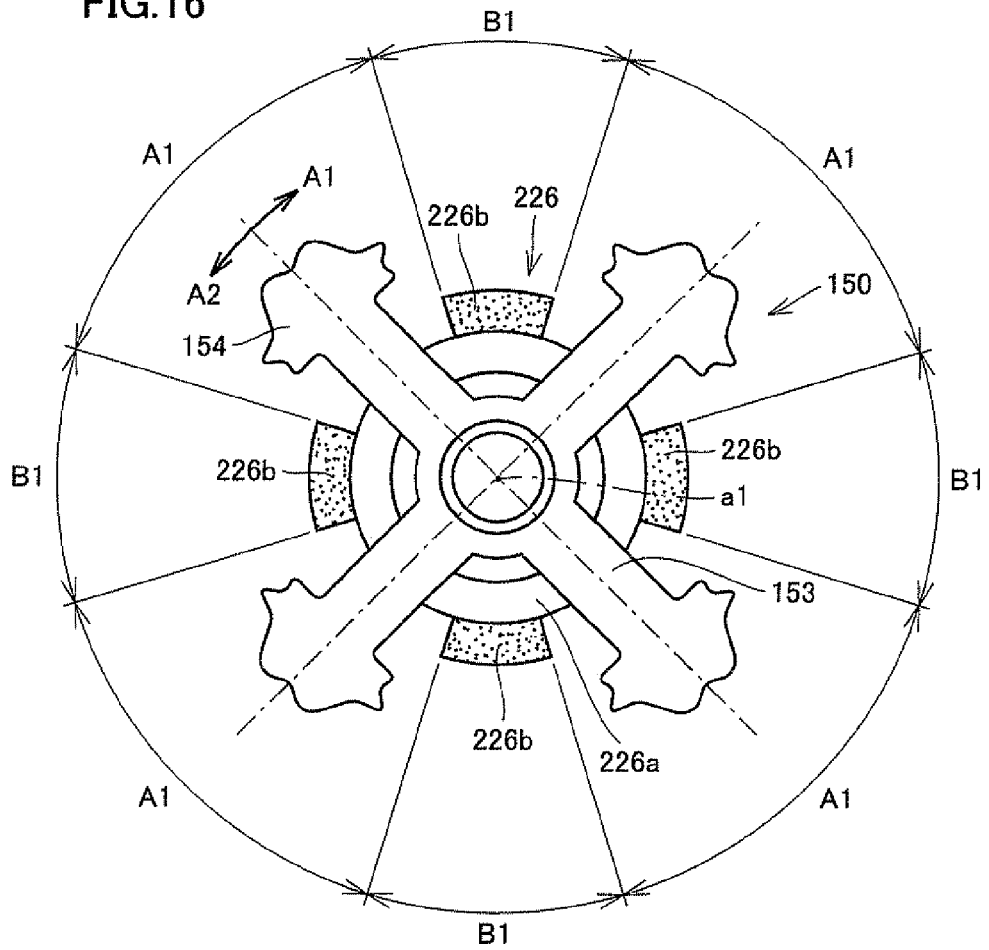
FIG. 16 is a first diagram showing an overlapping state of the annular plate and a radial plate in the second embodiment.

Even when friction plate 226 having this configuration is used, fluctuations in input torque bring about the state where friction plate 226 and four radial plates 153 rotate relatively to each other as shown in FIG. 16. When the fluctuations in input torque are small, radial plate 153 slightly rotates relatively to each other and produces small hysteresis torque within the range of first friction region A1. As a result, the small torque fluctuations are damped between radial plate 153 and first friction region A1.

Figure 17:
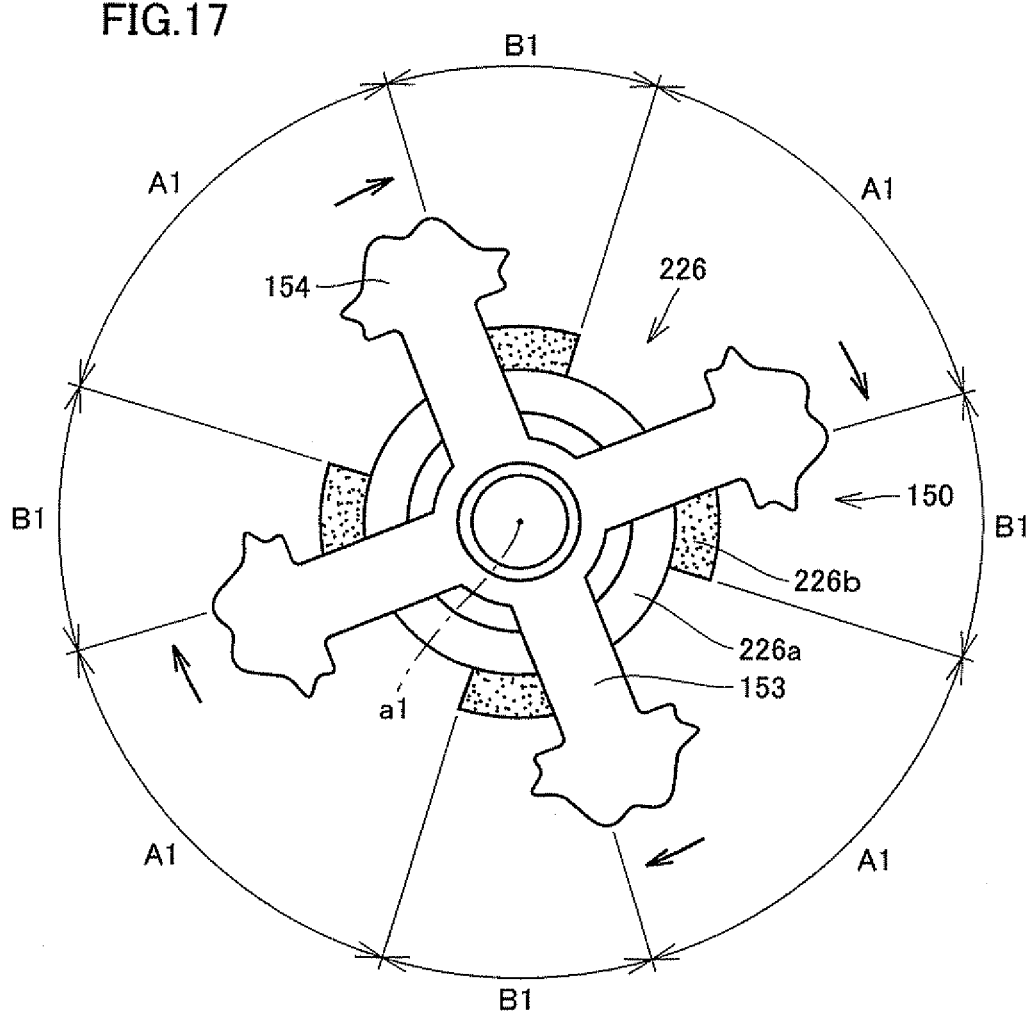
FIG. 17 is a second diagram showing an overlapping state of the annular plate and the radial plate in the second embodiment.
Figure 18:
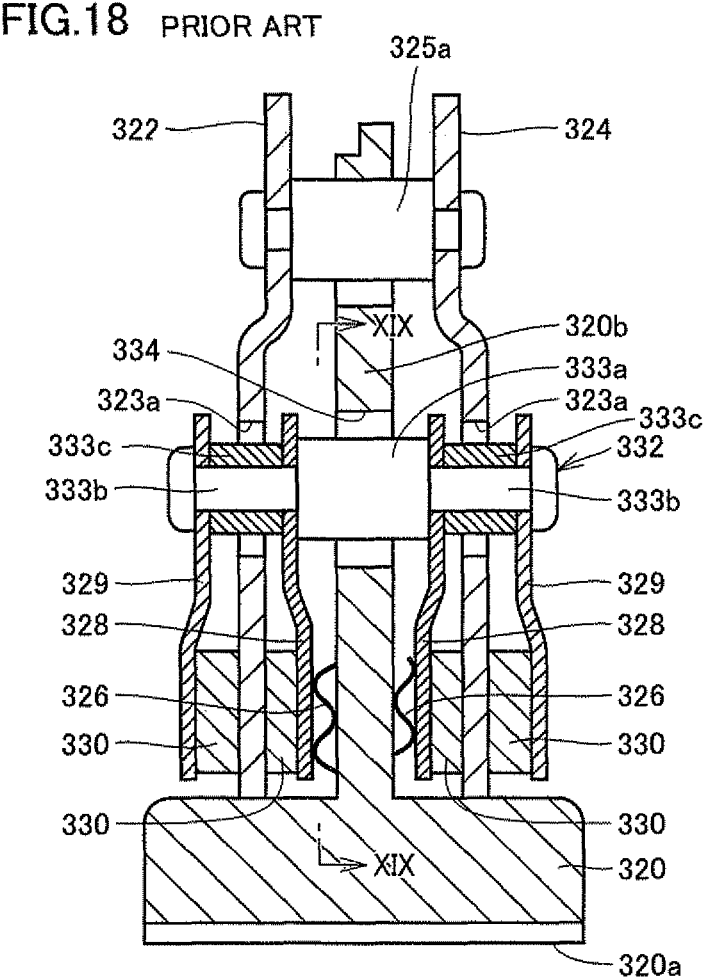
FIG. 18 is a cross-sectional view showing a structure of a damper mechanism in the background art.
Figure 19:
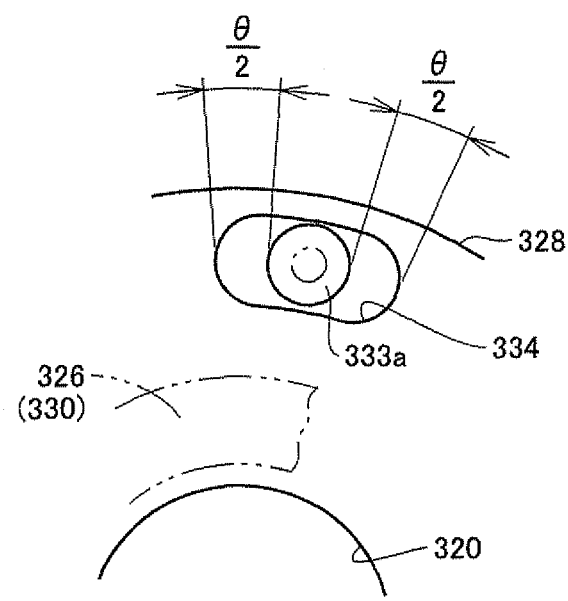
FIG. 19 is a diagram taken along line XIX-XIX in FIG. 18.
Figure 20:
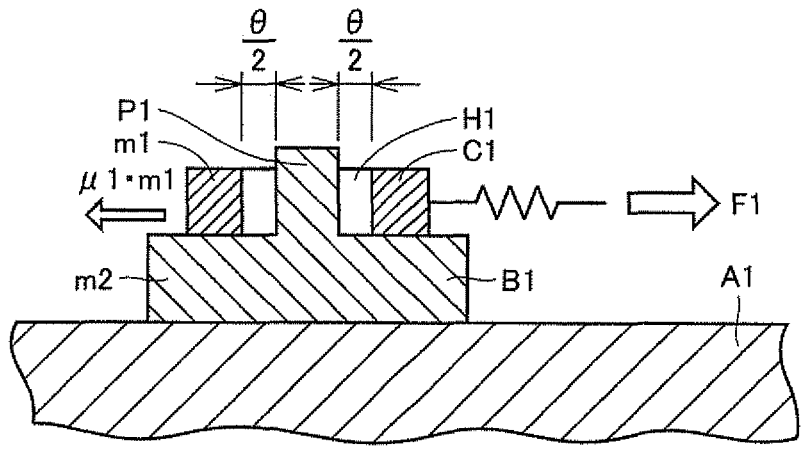
FIG. 20 is a first diagram schematically showing a principle of torque fluctuation damping in the background art.
Figure 21:
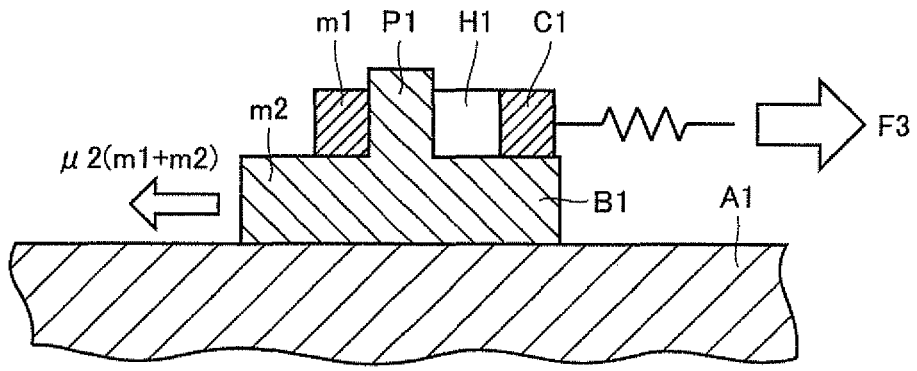
FIG. 21 is a second diagram schematically showing the principle of torque fluctuation damping in the background art.
Figure 22:
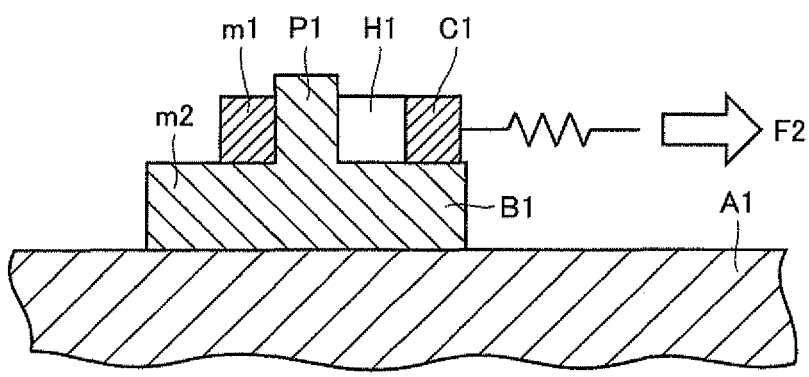
FIG. 22 is a third diagram schematically showing the principle of torque fluctuation damping in the background art.

Next, as shown in FIG. 17, when the fluctuations in input torque become large, radial plate 153 rotates and moves relatively greatly from first friction region A1 to reach second friction region B1, for example. At this time, radial plate 153 produces the hysteresis torque within the range of a total of the friction coefficients of first friction region A1 and second friction region B1 at a boundary between both regions because second friction region B1 is larger in friction coefficient than first friction region A1. As a result, when the fluctuations in torque input to the damper mechanism become large, the torque fluctuations are damped between radial plate 153 and first and second friction regions A1 and B1.

Next, when the fluctuations in input torque become larger, entire radial plate 153 rotates and moves relatively greatly to reach second friction region B1. Consequently, large hysteresis torque is produced because second friction region B1 is larger in friction coefficient than first friction region A1. As a result, the larger torque fluctuations are damped between radial plate 153 and second friction region B1.

(Functions and Effects)

As described above, in the damper mechanism according to the second embodiment based on the present invention as well, the relative rotation movement of annular plate 126 and radial plate 153 is not fixed and fluctuations in torque input to damper mechanism 100 can be damped constantly, as in the first embodiment. As a result, vibration at the time of engine startup as well as vibration that occurs at the time of torque fluctuations can be effectively damped. Consequently, production of the collision sound (commonly called rattle or muffled sound) caused by collision between gear wheels can be avoided and deterioration of the vehicle interior environment can be prevented.

Although the embodiments of the present invention have been described and illustrated above, it should be understood that the embodiments disclosed herein are illustrative and not limitative in any respect. The scope of the present invention is defined by the terms of the claims, and is intended to include any modifications within the scope and meaning equivalent to the terms of the claims.

DESCRIPTION OF THE REFERENCE SIGNS 100 damper mechanism; 121 spring damper; 126 annular plate; 126a first friction section; 126b second friction section; 128 drive plate (first rotating member); 128a inner plate; 128b outer plate; 140 torque limiter; 142 bolt; 143 support plate; 144, 145 lining portion; 146 pressing plate; 147 brake plate; 148 rivet; 149 coned disc spring; 150 hub (second rotating member); 151 cylindrical portion; 152 disc portion; 153 radial plate; 154 engaging portion; 160 input shaft; 200 flywheel; 226 friction plate; 226a inner annular plate; 226b outer friction plate; 300 crankshaft; a1 rotation center axis; 1261b side portion friction region; 1262b central portion friction region; A1 first friction region; B1 second friction region

The invention claimed is:

1. A damper mechanism, comprising:
a first rotating member; and
a second rotating member arranged to face said first rotating member, having a rotation center axis identical to a rotation center axis of said first rotating member, and being capable of relative displacement at a predetermined angle in a circumferential direction of said rotation center axis, wherein
said first rotating member includes a first pressure contact region arranged annularly around said rotation center axis and coming into pressure contact with said second rotating member,
said second rotating member includes a second pressure contact region arranged with a predetermined spacing around said rotation center axis and coming into pressure contact with said first pressure contact region,
said first pressure contact region has a first friction region and a second friction region larger in friction coefficient than said first friction region, said first friction region and said second friction region being alternately arranged along the circumferential direction,
said second pressure contact region is located at a central position of said first friction region in the circumferential direction when there is no fluctuation in torque input to the damper mechanism from outside, and
a central portion of said second friction section in the circumferential direction is larger in friction coefficient than a region of said second friction section adjacent to said first friction section.

2. The damper mechanism according to claim 1, wherein
said first rotating member has an annular plate disposed at a position facing said second rotating member,
a surface facing said second rotating member has a first friction section serving as said first friction region and a second friction section serving as said second friction region, said first friction section and said second friction section being alternately provided along the circumferential direction of said annular plate, and
said second pressure contact region is a radial plate extending radially from said rotation center axis, a plurality of radial plates being arranged along the circumferential direction.

3. The damper mechanism according to claim 2, wherein
said first friction sections and said second friction sections are alternately arranged at four positions at a pitch of 90° along the circumferential direction, respectively, and
said radial plates are arranged at four positions at a pitch of 90° in the circumferential direction.

4. The damper mechanism according to claim 1 wherein
said second friction section has a side portion friction section larger in friction coefficient than said first friction section and located at the region adjacent to said first friction section, and a central portion friction section larger in friction coefficient than said side portion friction section and located at the central portion of said second friction section.

5. The damper mechanism according to claim 1, wherein
the friction coefficient of said second friction section gradually increases from the region adjacent to said first friction section toward the central portion of said second friction section in the circumferential direction.

6. The damper mechanism according to claim 1, wherein
said first rotating member has a friction plate disposed at a position facing said second rotating member,
said friction plate has an inner annular plate and an outer friction plate arranged on an outer circumferential side of said inner annular plate and arranged with a predetermined spacing in the circumferential direction,
said inner annular plate in a region of said inner annular plate where said outer friction plate is not provided constitutes said first friction region,
said inner annular plate and said outer friction plate in a region of said inner annular plate where said outer friction plate is provided constitute said second friction region, and
said second pressure contact region is a radial plate extending radially from said rotation center axis, a plurality of radial plates being arranged along the circumferential direction.

7. The damper mechanism according to claim 6, wherein
said outer friction plates are arranged at four positions at a pitch of 90° along the circumferential direction, and
said radial plates are arranged at four positions at a pitch of 90° in the circumferential direction.

* * * * *